(No Model.) 2 Sheets—Sheet 1.

E. T. BURROWES & E. HAY.
ATTACHMENT FOR SPRING ACTUATED HOLDING MECHANISM FOR SHADES.

No. 584,723. Patented June 15, 1897.

Witnesses
A. M. Johnson.
F. S. Berry

Inventors
E. T. Burrowes
E. Hay
By their Attorney
J. B. Thurston

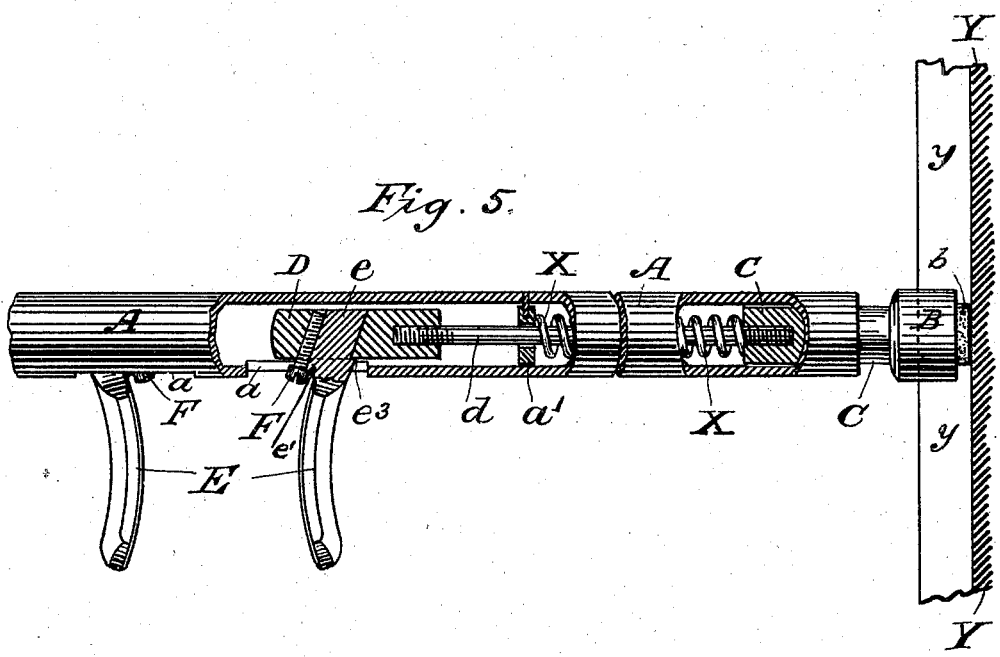

UNITED STATES PATENT OFFICE.

EDWARD T. BURROWES, OF PORTLAND, MAINE, AND ELLWOOD HAY, OF PHILLIPSBURG, NEW JERSEY; SAID HAY ASSIGNOR TO SAID BURROWES.

ATTACHMENT FOR SPRING-ACTUATED HOLDING MECHANISM FOR SHADES.

SPECIFICATION forming part of Letters Patent No. 584,723, dated June 15, 1897.

Application filed July 7, 1893. Serial No. 479,825. (No model.)

*To all whom it may concern:*

Be it known that we, EDWARD T. BURROWES, residing at Portland, county of Cumberland, State of Maine, and ELLWOOD HAY, residing at Phillipsburg, in the county of Warren and State of New Jersey, citizens of the United States, have invented certain new and useful Improvements in Attachments for Spring-Actuated Holding Mechanism for Shades; and we do hereby declare the following to be a full, clear, and exact description of the invention, such as will enable others skilled in the art to which it appertains to make and use the same.

This invention relates to an improvement in attachments for spring-actuated shade-holding mechanism; and it is embodied in the construction and arrangement of parts hereinafter described, and definitely pointed out in the claims.

The object of the invention is the provision of an improved form of handle so fashioned that the same may be readily and firmly attached to the spindle after the holding mechanism has been adjusted to its shade, and, further, to provide a connection for the handle or pendant which can readily be adjusted or applied through the pendant-opening and locked in position. Heretofore it has been suggested to attach these pendants by forming an opening in the stick or tube and burring or bending down the protruding end of the tongue of the pendant above the spindle or rod. Such means are objectionable, inasmuch as these fixtures are carried by a pocket on the end of the curtain, and, further, the slotting of the tube in two diametrically opposite points tends to weaken the tube, which is comparatively light.

Figure 1:
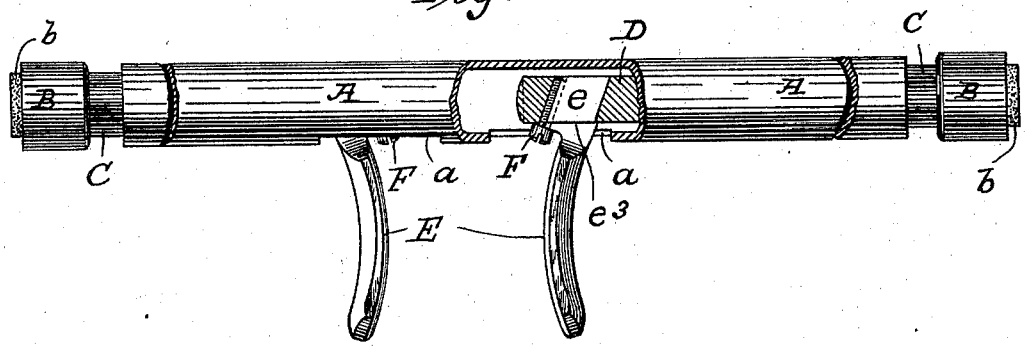
Figure 2:
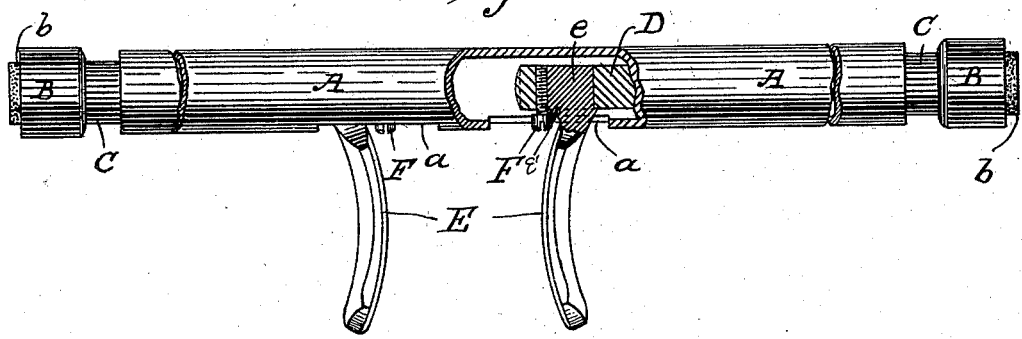
Figure 3:
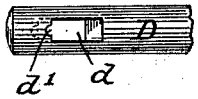
Figure 4:
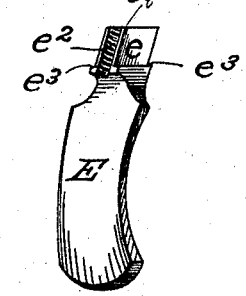

In the accompanying drawings, in which is shown the preferred form of device and in which like letters of reference designate corresponding parts in the several views, Figure 1 is an elevation of a curtain-stick, partly in section, showing the improvement. Fig. 2 is a similar view of a slightly-different form. Fig. 3 is a plan view of one end of a spindle. Fig. 4 is a perspective view of one of the pendants; and Fig. 5 is an elevation of a tube with the improvement, a portion of the tube being shown broken away.

In the drawings, A designates the usual hollow curtain-stick; B, the friction-holding tips, which are carried by the spindles C. As is usual in this class of devices, coiled springs X are employed to force the spindles out.

The tubular stick is cut away at $a$ on its under side at or near the center, forming the the openings through which the shanks or inner ends of the pendants pass. The inner ends D of the spindles have by preference inclined sockets $d$ cut therein, the inner end walls of which are curved and threaded at $d'$.

E designates the pendants, having tongues or shanks $e$ on their upper ends, formed with lateral projections $e'$, which extend slightly beyond the plane of the upper side portion of the pendant.

In Fig. 1 the shank or tongue is shown to be inclined and conforms to the shape of the socket $d$, while in Fig. 2 the socket and tongue are perpendicular. The inner end of the tongue has a segmental threaded cavity therein which forms with the curved section of the socket a circular threaded aperture located laterally beyond the plane of the pendant.

$e^3$ designates a shoulder on the pendant, which serves to limit the upward adjustment thereof.

F designates a screw located in the circular aperture and serving as a key to lock the pendant to the spindle.

It will be observed that by the above-described construction the pendant can be adjusted to the spindle, and by having the screw located laterally beyond the pendant the former can be readily forced in by using any convenient form of tool.

To have the pendants detachably secured to the spindle by independent locking means, or formed so that they can be applied and removed after the stick is within the pocket of the curtain, is of great advantage, and we believe that we are the first to provide such a construction.

Having thus described the invention, what is claimed as new, and desired to be secured by Letters Patent, is—

1. In a spring-actuated holding device for shades, the combination with a hollow stick having an opening therein, a friction-tip, a spindle engaging the same extending into the stick, a removable pendant having a portion fashioned to enter through the opening, and independent means for detachably securing the pendant to the spindle.

2. In a spring-actuated holding device for shades, the combination with a hollow stick, a socketed spindle therein, a friction-tip on the spindle, a pendant or handle passing into the stick having a tongue entering the socket in the spindle, and removable means interposed between the spindle and tongue for securing the pendant to the spindle.

3. The combination with the hollow stick and socketed spindle, of a pendant having a tongue formed with a lateral projecting section arranged to enter the socket of the spindle, and a screw interposed and engaging the walls of the socket and the projection on the tongue, substantially as described.

4. The combination with a hollow stick and a spindle having an inclined socket therein, of a pendant having an inclined tongue formed with a lateral projection arranged to enter the socket of the spindle, and a screw interposed and engaging the walls of the socket and the inclined edge of the tongue projection, substantially as described.

5. In a holding device for shades, the combination with a hollow stick, of spindles within the stick, detachable actuating-handles passing through the stick and having extensions engaging the spindles, and independent locking means for maintaining the handles in engagement with the spindles, and for preserving their relative adjustments.

In testimony whereof we affix our signatures in presence of two witnesses.

EDWARD T. BURROWES.
ELLWOOD HAY.

Witnesses as to Edward T. Burrowes:
CHAS. SUMNER COOK,
JOHN H. RIDGE.

Witnesses as to Ellwood Hay:
B. C. FROST,
JNO. A. BACHMAN.